US010384398B2

(12) United States Patent
Kuwahara

(10) Patent No.: US 10,384,398 B2
(45) Date of Patent: Aug. 20, 2019

(54) DEVICE AND METHOD FOR MANUFACTURING EMBLEM WITH INCORPORATED IC CHIP

(71) Applicants: Nobuo Kuroda, Osaka (JP); Eiji Kuwahara, Osaka (JP)

(72) Inventor: Eiji Kuwahara, Osaka (JP)

(73) Assignees: Nobuo Kuroda, Osaka (JP); Eiji Kuwahara, Osaka (JP)

( * ) Notice: Subject to any disclaimer, the term of this patent is extended or adjusted under 35 U.S.C. 154(b) by 402 days.

(21) Appl. No.: 15/317,611

(22) PCT Filed: May 2, 2014

(86) PCT No.: PCT/JP2014/062181
§ 371 (c)(1),
(2) Date: Dec. 9, 2016

(87) PCT Pub. No.: WO2015/166584
PCT Pub. Date: Nov. 5, 2015

(65) Prior Publication Data
US 2017/0217084 A1 Aug. 3, 2017

(51) Int. Cl.
*B29C 65/32* (2006.01)
*B29C 51/08* (2006.01)
(Continued)

(52) U.S. Cl.
CPC .......... *B29C 65/32* (2013.01); *B29C 35/0805* (2013.01); *B29C 35/12* (2013.01);
(Continued)

(58) Field of Classification Search
CPC ......... B29C 43/18; B29C 35/12; B29C 65/04; B29C 2043/3602; B29C 66/00463;
(Continued)

(56) References Cited

U.S. PATENT DOCUMENTS

2010/0251908 A1   10/2010   Yoshida
2013/0068376 A1*   3/2013   Kuwahara ............... B29C 35/12
                                                               156/219

FOREIGN PATENT DOCUMENTS

EP      2 578 382 A1    4/2013
JP      S61-16608 B2    5/1986
(Continued)

OTHER PUBLICATIONS

Machine translation of JP 07205600 A; Publication Aug. 8, 1995.*
(Continued)

*Primary Examiner* — Vishal I Patel
(74) *Attorney, Agent, or Firm* — Oliff PLC

(57) ABSTRACT

A device and a method for manufacturing an emblem of thermoplastic synthetic resin with an incorporated IC chip by high frequency dielectric heating without damaging the IC chip, the device including: an upper metal mold having with a fusion cutting blade; a support frame along the perimeter and upper surface of the table; a slide board on top of the table that is slidable in axial directions relative to the table; a metal plate on the upper surface of the slide board; wherein pressing the upper layer material with the mold from above and subjecting the material to high frequency dielectric heating, the IC chip is placed in an upper position of the recessed section, then the slide board is driven to slide below the mold and subsequently the heating operation is executed without any risk of applying pressure onto the IC chip.

3 Claims, 4 Drawing Sheets

(51) Int. Cl.
  B44C 3/08     (2006.01)
  H05B 6/14    (2006.01)
  B29C 65/74   (2006.01)
  B29C 65/00   (2006.01)
  B29C 35/08   (2006.01)
  B29C 43/18   (2006.01)
  B29C 43/40   (2006.01)
  B29C 65/04   (2006.01)
  B44C 3/02    (2006.01)
  B29C 35/12   (2006.01)
  B29K 23/00   (2006.01)
  B29K 105/00  (2006.01)
  B29L 31/00   (2006.01)
  B29L 17/00   (2006.01)
  B29C 65/36   (2006.01)
  B29C 43/04   (2006.01)
  B29C 43/14   (2006.01)
  B29C 43/36   (2006.01)
  B29K 105/20  (2006.01)

(52) U.S. Cl.
  CPC .............. *B29C 43/18* (2013.01); *B29C 43/40* (2013.01); *B29C 51/08* (2013.01); *B29C 65/04* (2013.01); *B29C 65/7441* (2013.01); *B29C 66/00463* (2013.01); *B29C 66/1122* (2013.01); *B29C 66/30621* (2013.01); *B29C 66/433* (2013.01); *B29C 66/73921* (2013.01); *B29C 66/81457* (2013.01); *B29C 66/8322* (2013.01); *B44C 3/02* (2013.01); *B44C 3/085* (2013.01); *H05B 6/14* (2013.01); *B29C 43/04* (2013.01); *B29C 43/14* (2013.01); *B29C 65/366* (2013.01); *B29C 65/3676* (2013.01); *B29C 66/71* (2013.01); *B29C 66/8122* (2013.01); *B29C 2043/3602* (2013.01); *B29C 2793/009* (2013.01); *B29K 2023/12* (2013.01); *B29K 2105/20* (2013.01); *B29K 2105/256* (2013.01); *B29L 2017/006* (2013.01); *B29L 2031/722* (2013.01); *B29L 2031/744* (2013.01)

(58) Field of Classification Search
  CPC ... B29C 2793/009; B29C 43/40; B29C 43/14; B29C 43/04; B29C 66/8322; B29C 66/81457; B29C 66/8122; B29C 66/73921; B29C 66/71; B29C 35/0805; B29C 66/433; B29C 51/08; B29C 65/32; B29C 65/366; B29C 65/3676; B29C 65/7441; B29C 66/1122; B29C 66/30621; B44C 3/02; B44C 3/085; B29K 2105/20; B29K 2023/12; B29K 2105/256; B29K 2021/00; B29K 2027/06; B29K 2075/00; B29K 2067/00; B29K 2023/00; B29L 2031/722; B29L 2031/744; B29L 2017/006; H05B 6/14
  See application file for complete search history.

(56) References Cited

FOREIGN PATENT DOCUMENTS

| JP | H06-33040 B2 | 5/1994 |
| JP | 2542551 B2 | 10/1996 |
| JP | 2010-214867 A | 9/2010 |
| JP | 2010-277186 A | 12/2010 |
| JP | WO2011/151904 A1 | 7/2013 |
| KR | 101 204 393 B1 | 12/2012 |
| WO | 2011/125173 A1 | 10/2011 |

OTHER PUBLICATIONS

Jul. 10, 2018 Office Action issued in Japanese Patent Application No. 2018-116126.
Jul. 22, 2014 International Search Report issued in International Patent Application No. PCT/JP2014/062181.
Oct. 9, 2017 Extended Search Report issued in European Patent Application No. 14891113.4.

* cited by examiner

UP ←——→ DOWN

DEVICE AND METHOD FOR MANUFACTURING EMBLEM WITH INCORPORATED IC CHIP

TECHNICAL FIELD

The present invention relates to a device and a method for manufacturing an emblem with an incorporated or embedded, IC chip by means of high frequency dielectric heating, using thermoplastic synthetic resin film as starting material. Such an emblem can suitably be attached to a military uniform, a police uniform, a fire fighter uniform or an official uniform of any other public office or a private company.

BACKGROUND ART

Patent literatures that disclose a method for manufacturing a decorative piece such as an emblem, an applique or a sticker by high frequency dielectric heating, using thermoplastic synthetic resin film as starting material and a decorative piece manufactured by the method include among others Patent Literatures 1, 2 and 3 listed hereinafter.

For instance, a decorative piece as disclosed in Patent Literature 1 includes a lower layer (formed by using vinyl chloride film 11) and an upper layer made of thermoplastic synthetic resin (a polyester sheet 1). A sheet of thermoplastic synthetic resin film may be used as the material of the upper layer. The lower layer may be made of any appropriate material such as woven fabric, knitted fabric, synthetic resin (vinyl chloride 11 in Patent Literature 1) or synthetic leather. When a decorative piece is to be provided as a thermally transferable one, thermal bonding film can be used for the lower layer of the decorative piece.

As described above, a decorative piece having an upper layer that is made of thermoplastic synthetic resin and a lower layer can be manufactured by means of high frequency dielectric heating.

When manufacturing a decorative piece by means of high frequency dielectric heating, a metal mold table that operates as one of the electrodes for high frequency dielectric heating (which corresponds to the lower electrode 16' in Patent Literature 1) and a carving metal mold that operates as the other electrode for high frequency dielectric heating (which corresponds to the upper electrode 16 in Patent Literature 1) are employed.

A carving metal mold as described above has a fusion cutting blade (which corresponds to the blade section 17 in Patent Document 1) and a pressing blade (which corresponds to the protruding section 14' in Patent Literature 1). The fusion cutting blade has a sharp edge running along the outer contour line of the pattern to be produced and is employed to cut the thermoplastic synthetic resin film that is the material of the patterned piece to be manufactured by fusion cutting. On the other hand, the edge of the pressing blade is placed in a plane located above the horizontal plane where the sharp edge is found and not as sharp as the above described sharp edge of the fusion cutting blade. The pressing blade is designed to produce a given three-dimensional shape out of the thermoplastic synthetic resin film.

For manufacturing the emblem, if necessary, firstly a pattern is printed on a sheet of thermoplastic synthetic resin film, which is the material of the upper layer. Then, the lower film material is laid on the metal mold table and subsequently a sheet of thermoplastic synthetic resin film, which is the material of the upper layer, is laid thereon. Thereafter, the thermoplastic synthetic resin film and the lower layer material are pressed down from above by means of the carving metal mold and a high frequency dielectric heating operation is executed on them. As a result, the upper layer material is fused and a three-dimensional pattern is formed on the thermoplastic synthetic resin film by the carving operation of the carving metal mold and the pressure applied by the pressing blade. Additionally, the thermoplastic synthetic resin film is fused and cut by the fusion cutting blade to define the outer contour line of the patterned piece.

Furthermore, as a result of the high frequency dielectric heating operation, the thermoplastic synthetic resin film is molten to consequently bond together and unify the upper layer and the lower layer to form a decorative piece. Then, all an unnecessary parts are removed to complete the operation of producing a finished decorative piece.

When the decorative piece to be manufactured is a thermal bonding film type one (in which the lower layer is made of a material having a property like that of thermal adhesives and can thermally be bonded to a jacket or some other outer wear to which it is to be bonded by ironing), a sheet of release paper may be arranged on the lower surface of the formed lower layer. Additionally, transparent carrier film may be arranged on the upper surface of the patterned piece. When the lower layer material is fabric or the like, the lower layer material may be cut by an appropriate known means instead of fusion cutting by high frequency dielectric heating.

As described above, emblems made of thermoplastic synthetic resin can be manufactured at low cost on a mass production basis by means of pressure applied from above and high frequency dielectric heating.

PRIOR ART LITERATURES

Patent Literatures

[Patent Literature 1] JP-B-No. (Sho) 61-016608
[Patent Literature 2] JP-B-No. (Hei) 06-033040
[Patent Literature 3] JP-B-No. 2542551

Problem to be Solved

As described above, emblems made of thermoplastic synthetic resin can be manufactured at low cost on a mass production basis, and also soft and lightweight emblems can be manufactured by using soft resin film. Thus, if such an emblem is attached to the breast pocket of a shirt or a uniform jacket, it would not hang down from the pocket due to its weight and, if such an emblem is attached to one of the sleeves of a shirt or a uniform jacket, it can accommodate any move of the arm and would not give any uncomfortable feeling to the wearer of the shirt or the jacket, whichever appropriate, because of its softness and flexibility.

However, when emblems are manufactured on a mass production basis, all the emblems manufactured in lots show a same shape, a same pattern and same colors and hence they cannot be used to identify the individuals wearing them. In recent years, there has been a demand for emblems and other decorative pieces that can be used to identify individuals who are wearing them.

Thus, there is a demand for emblems made of thermoplastic synthetic resin, each having an IC chip embedded therein and containing information input therein that is necessary to identify the wearer of the emblem. More specifically, such an emblems is required to have an IC chip incorporated, or embedded, between the upper layer (and the intermediate layer if exists) and the lower layer of the emblem. As described above, emblems made of thermoplastic synthetic resin can be manufactured at low cost on a mass production basis and also soft and lightweight emblems can be manufactured by using soft resin film. Thus, if such an emblem is attached to the breast pocket of a shirt or a uniform jacket, it would not hang down from the pocket due to its weight and, if such an emblem is attached to one of the sleeves of a shirt or a uniform jacket, it can accommodate any move of the arm and would not give any uncomfortable feeling to the wearer of the shirt or the jacket, whichever appropriate, because of its softness and flexibility.

However, when emblems are manufactured on a mass production basis, all the emblems manufactured in lots show a same shape, a same pattern and sane colors and hence they cannot be used to identify the individuals wearing them. In recent years, there has been a demand for emblems and other decorative pieces that can be used to identify individuals who are wearing them.

Thus, there is a demand for emblems made of thermoplastic synthetic resin, each having an IC chip embedded therein and containing information input therein that is necessary to identify the wearer of the emblem. More specifically, such an emblems is required to have an IC chip incorporated, or embedded, between the upper layer (and the intermediate layer if exists) and the lower layer of the emblem.

However, when an emblem is to be manufactured with an IC chip incorporated between the upper layer (and the intermediate layer if exists) and the lower layer, there arises a problem that the IC chip is damaged by the pressure applied to it from above by the carving metal mold during the process of manufacturing it.

In view of the above identified circumstances, it is therefore an object of an embodiment to provide a device and a method for manufacturing an emblem of thermoplastic synthetic resin with an incorporated IC chip by high frequency dielectric heating without damaging the IC chip. In view of the above identified circumstances, it is therefore the object of the embodiment to provide a device and a method for manufacturing an emblem of thermoplastic synthetic resin with an incorporated IC chip by high frequency dielectric heating without damaging the IC chip.

SUMMARY

According to the an embodiment, there is provided a device for manufacturing an emblem of thermoplastic synthetic resin with an incorporated IC chip by high frequency dielectric heating, the device comprising:
an upper metal mold having at least a fusion cutting blade;
a table;
a support frame disposed along the perimeter and on the upper surface of the table;
a slide board disposed on the upper surface of the table so as to be slidable in the axial directions relative to the table; and
a metal plate arranged on an upper surface of the slide board; wherein
a solid lubricating agent is provided on an upper surface of the table; and
the support frame includes long side support frame members arranged along the long sides of the table and short side support frame members arranged along the short sides of the table;
steps being formed on the respective lower surfaces of the long side support frame members along the transversal inner sides thereof;
steps being formed on the upper surface of the slide board along the transversal outer sides thereof so as to be engaged with the respective steps of the long side support frame members in order to make the slide board axially slidable relative to the table;
while the metal plate is provided on an upper surface thereof with a flat surface area, and a recessed section dimensioned to snugly receive an IC chip so as to make the IC chip abut to inner surfaces of the recessed section, a cushion member being arranged in the recessed section; such that an upper layer material is placed on the flat area of the metal plate immediately prior to the time of imparting a given shape to the upper layer material by subjecting it to high frequency dielectric heating; and,
immediately prior to the time of subjecting a lower layer material by a high frequency dielectric heating operation, the IC chip placed on the upper surface of the lower layer material and the upper layer material to high frequency dielectric heating so as to bond the upper layer material, and the lower layer material together by fusion bonding, the IC chip is placed in an upper position of the recessed section, then the slide board is driven to axially slide so as to be located below the upper metal mold, and subsequently a high frequency dielectric heating operation is executed without any risk of applying pressure onto the IC chip due to the provision of the recessed section and the cushion member.

According to the present embodiment, there is also provided a method of manufacturing an emblem of a thermoplastic synthetic resin material with an incorporated IC chip by high frequency dielectric heating, the method comprising: arranging a sheet of release paper on a flat upper surface of a table, the table operating as cathode, and an upper layer material on the upper surface of the sheet of release paper; pressing the upper layer material by means of an upper metal mold from above and subjecting the upper layer material to high frequency dielectric heating so as to impart a given shape to the upper layer material and produce an intermediate;
making the upper metal mold temporarily hold the intermediate and lifting the upper metal mold along with the intermediate;
driving a slide board disposed on the table to axially slide so as to place the recessed section 65 formed on the upper surface of the metal plate on the slide board right below the upper metal mold;
placing a sheet of release paper, a lower layer material and the IC chip on the recessed section; and lowering the upper metal mold to press the intermediate, the IC chip and the lower layer material, subjecting them to high frequency dielectric heating so as to bond the intermediate and the lower layer material together by fusion bonding. Preferably, a sheet of release paper is arranged on the lower surface of the upper layer material.

Advantages

Thus, according to the present embodiment, at the time of bonding the upper layer material and the lower layer material together by fusion bonding, the IC chip is free from the pressing force applied to the upper layer and lower layer materials by the upper metal mold because it is located in the recessed section. If it receives the pressing force applied by the upper metal mold, the IC chip is prevented from being damaged by the pressing force because the pressing force is absorbed by the cushion member.

According to the present embodiment, a given shaped is imparted to the upper layer material (including the intermediate layer material) simply by driving the slide board to make it axially slide and, at the same time, the upper layer material and the lower layer material can be bonded together by fusion bonding without causing the IC chip to be damaged by the pressing force applied to the upper layer and lower layer materials by the upper metal mold. The present embodiment provides a device having a simple and compact structure for manufacturing an emblem of a thermoplastic synthetic resin material with incorporated IC chip that does not need to use tables of two different types. According to the present embodiment, a given shaped is imparted to the upper layer material (including the intermediate layer material) simply by driving the slide board to make it axially slide and, at the same time, the upper layer material and the lower layer material can be bonded together by fusion bonding without causing the IC chip to be damaged by the pressing force applied to the upper layer and lower layer materials by the upper metal mold. The present embodiment provides a device having a simple and compact structure for manufacturing an emblem of a thermoplastic synthetic resin material with incorporated IC chip that does not need to use tables of two different types.

EMBLEM

Figure 1:
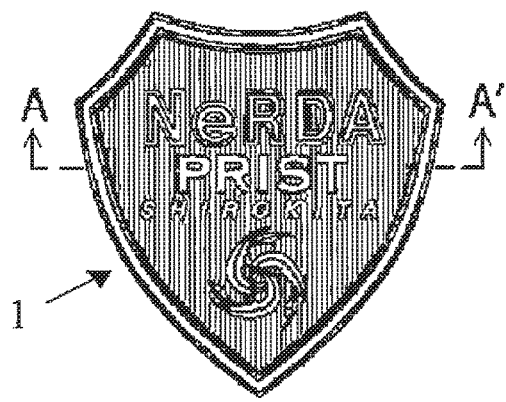
FIG. 1 is a schematic front view of an emblem manufactured by a manufacturing device according to an embodiment.
Figure 2:
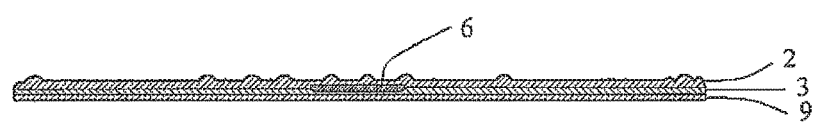
FIG. 2 is an enlarged schematic cross sectional view of the emblem of FIG. 1 taken along line A-A in FIG. 1.
Figure 3:
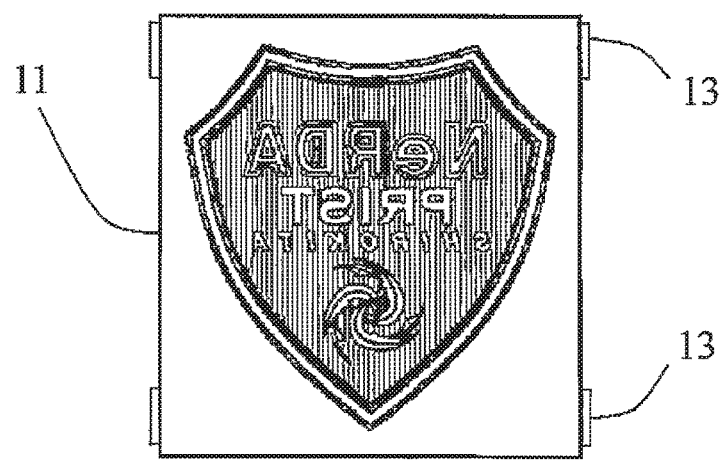
FIG. 3 is a bottom view of the upper metal mold of the manufacturing device of an embodiment.

As shown in FIG. 2, an emblem manufactured by a manufacturing device and a manufacturing method according to an embodiment comprises an upper layer 2 that is made of thermoplastic synthetic resin and a lower layer 3. In the embodiment shown in FIG. 2, a sheet of release paper 9 is attached to the lower surface of the lower layer 3.

As will be described hereinafter, the upper layer 2 is formed by using a surface layer material 4a and an intermediate layer material 5a and the surface layer material 4a and, the intermediate layer material 5a are integrally bonded to each other by fusion bonding using high frequency dielectric heating. An IC chip 6 is arranged between the upper layer 2 and the lower layer 3 of the embodiment 1 according to the present invention.

<Surface Layer Material>

As described above the upper layer 2 is formed by using a surface layer material 4a and an intermediate layer material 5a.

A three-dimensional shape is imparted to the surface layer material 4a. In addition, if necessary, the upper surface of the surface layer is subjected to a printing operation. Thermoplastic synthetic resin film can be used for the surface layer material 4a, while any known material that can be used for synthetic resin-made decorative piece may be used as the surface layer material 4a. Examples of such known materials include polyvinyl chloride film, polyurethane film, polyester film and polyolefin film. The thermoplastic synthetic resin film to be used as the surface layer material 4a may be laminated film.

Metal may be deposited on the thermoplastic synthetic resin film to be used as the surface layer material 4a by means of a known vapor deposition technique so as to give a metallic appearance to the decorative piece to be produced. In other words, metallized film selected from metallized polyvinyl chloride film, metallized polyurethane film, metallized polyester film, metallized polyolefin film etc. may be used as the surface layer material 4a. Any appropriate known metal may be used for the metal vapor deposition. Examples of appropriate metals include aluminum, chromium, silver and tin.

Carrier film 7 may additionally be arranged on the upper surface of the surface layer 4 and furthermore polypropylene film 8 may additionally be laid on the upper surface of the carrier film 7. The lower surface of the carrier film 7 has a function of operating as adhesive. Therefore, when a pattern is produced by a set of a plurality of patterned pieces that are arranged separately relative to each other, the relative positions of the patterned pieces do not change.

Any known carrier film can be used for the carrier film 7. However, the carrier film 7 is required to be transparent so that the pattern printed on the surface layer 4 may be visible from outside. While the carrier film 7 may appropriately have a thickness between 30 and 60 micron, there are no particular limitations to the thickness of the carrier film 7 for the purpose of the embodiment.

Any known polypropylene film may be used as the polypropylene 8 on the carrier film 7 provided that it is translucent or transparent.

After the completion of the operation of preparing the emblem, the polypropylene film 8 is held in position until the emblem is transferred onto a garment. When a plurality of graphics and/or characters is formed by using only the carrier film 7, they may easily be displaced and/or some of them may wholly or partly come off at the time of transferring the emblem, because the retention force of carrier film is weak. Thus, the use of polypropylene film 8 is desirable because of the reinforcement effect it can provide to the carrier film 7. Additionally, since polypropylene film 8 is not cut by fusion cutting, it is drawn to the lateral surface of the emblem so that the polypropylene film, which is the surface material of the emblem, gets to the lower layer to make the lateral surface of the emblem show a neatly and attractively finished appearance. Furthermore, the polypropylene film 8 is employed because the carrier film 7 can more often than not be cut along the fusion cutting blade when carrier film 7 is used without polypropylene film 8. Then, the surface layer material can clearly be cut along the fusion cutting blade.

<Intermediate Layer>

The intermediate layer material 5a is employed to make the emblem show a certain thickness and prevent voids from being formed in the emblem because, if such voids are formed, the emblem can become depressed above the voids. Thermoplastic synthetic resin film can be used as the intermediate layer material 5a. Examples of thermoplastic synthetic resin film that can be used as the intermediate layer material 5a include polyvinyl chloride sheets, polyurethane sheets and polyolefin sheets. As pointed out above, the intermediate layer material 5a is employed only when the embodiment is required to show a certain thickness and hence it is not an indispensable material.

The intermediate layer 5 and the surface layer 4 are integrally bonded to each other by fusion bonding using high frequency dielectric heating to become a unified layer, which is referred to as "the upper layer 2".

<Lower Layer>

The lower layer 3 is a layer to be used to attach the upper layer 2 to the part of a garment for receiving the upper layer 2.

When the emblem is of the type to be attached to a garment by heating the emblem typically by means of an iron, a lower layer 3 having an adhesive or bonding function is employed for the emblem. However, the lower layer 3 of an emblem according to an embodiment is by no means limited to one having an adhesive or bonding function.

The lower layer 3 is formed by using a lower layer material 3a. Any material known in this technical field may be used as the lower layer material 3a. In the instance of the embodiment that is illustrated in the drawings and will be described hereinafter, hot melt film 9a that comes to show adhesivity when heated and thermoplastic synthetic resin film 9b that is to be laid on the upper surface of the hot melt film 9a are used as the lower layer material 3b, although it may be needless to say that only the use of hot melt film 9a is sufficient for the purpose of the embodiment.

Alternatively, fabric or the like may be used as the lower layer material. As in the case of the illustrated embodiment, a sheet of release paper 9c may be arranged under the hot melt film 9a. Thus, the lower layer material 3a may appropriately be selected by considering the performance that the emblem to be manufactured is required to exhibit.

<Ic Chip>

An IC chip 6 is arranged between the upper layer 2 and the lower layer 3.

An ID number is input into the IC chip in advance and then stored in a computer. Thus, the ID number can be read out by an appropriate reader and verified by the computer that is connected to the reader. Various data such as photographic data on the wearer of the emblem where the IC chip is embedded can be input and stored in the computer in advance. With such an arrangement, any forgery of emblems and uses of forged emblems can effectively be prevented from taking place and also the ability of controlling the use of emblems can be improved.

For example, a TFU-TL741B (ID tag; available from Fujitsu Frontech) may be used as the IC chip 6, although the embodiment is by no means limited to the use of such a tag.

<Manufacturing Device>

Now, a device for manufacturing an emblem 1 in which an IC chip 6 is embedded by using a thermoplastic synthetic resin material and high frequency dielectric heating will be described below. The device comprises an upper metal mold 11 that also operates as an anode and a jig 21 that also operates as a cathode.

A three-dimensional shape is carved in the lower surface of the upper metal mold 11, which is provided with a fusion cutting blade and a pressing blade. Such a metal mold can be prepared by using an appropriate technique that is well known to those who are skilled in the art. Note that a pressing blade is employed only if necessary. In other words, it is not essential.

As will be described hereinafter, the upper metal mold 11 is also provided with a temporary holding means 13. The temporary holding means 13 is only required to temporarily take up an intermediate 23 that is formed by using a surface layer material 4a and an intermediate layer material 5a with the upper metal mold 11. For example, the temporary holding means 13 may be adhesive tapes arranged at the front side and the rear side of the upper metal mold 11 as in the case of the illustrated embodiment, although the temporary holding means 13 according to an embodiment is by no means limited to such an arrangement.

The position of the upper metal mold 11 is fixed. The slide board 51 and a metal plate 61 on the table 31, which will be described hereinafter, will be moved in axial directions relative to the upper metal mold 11. The expression of "an axial direction" refers to a direction running in the direction of the long sides of the table 31, which is the direction running from left to right or vice versa in FIG. 4. The directions running along the short sides of the table 31 will be referred to as "the transversal directions" hereinafter.

Figure 4:
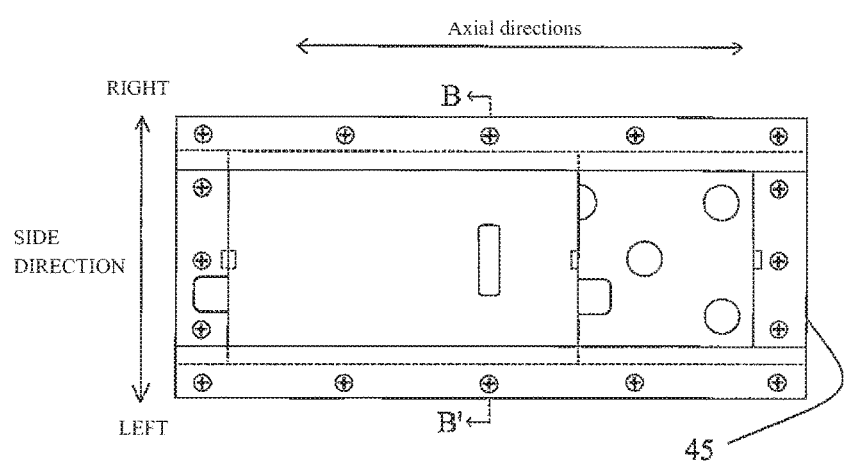
FIG. 4 is a schematic plan view of the jig of the manufacturing device of an embodiment in a state where the second step of the manufacturing method is being executed.
Figure 5:
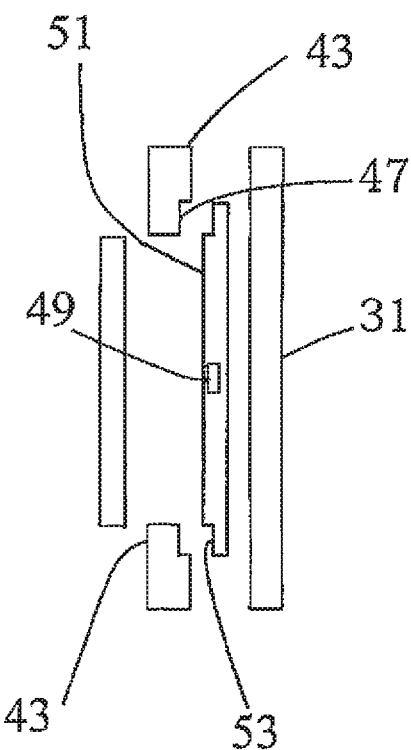
FIG. 5 is an exploded schematic side view of the jig of FIG. 4, separately showing the components of the jig.
Figure 6:
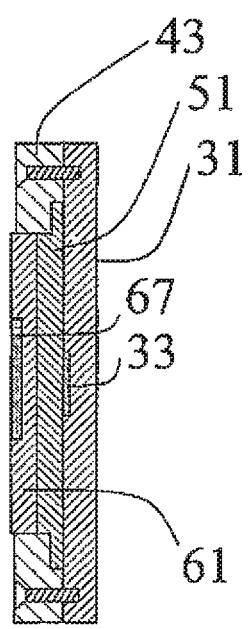
FIG. 6 is a schematic cross sectional view of the jig of FIG. 4 taken along line B-B' in FIG. 4.
Figure 7:
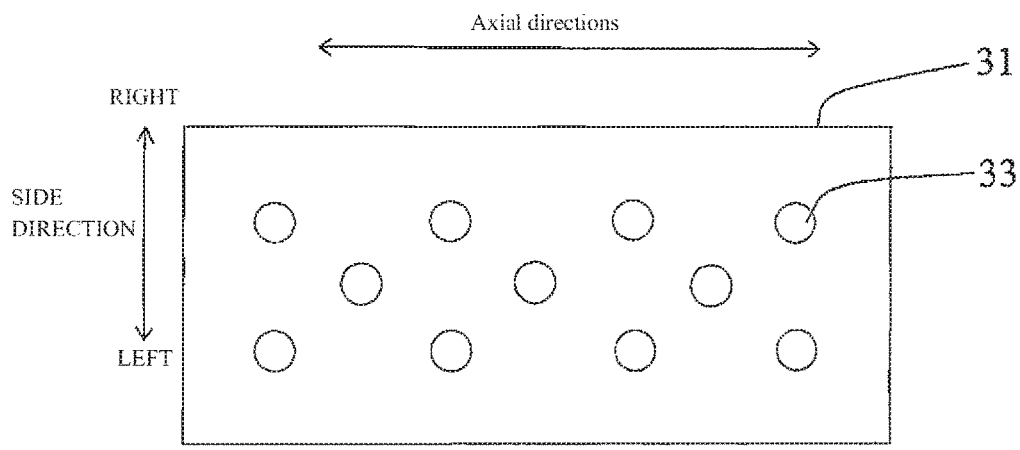
FIG. 7 is a schematic plan view of the table.
Figure 8:
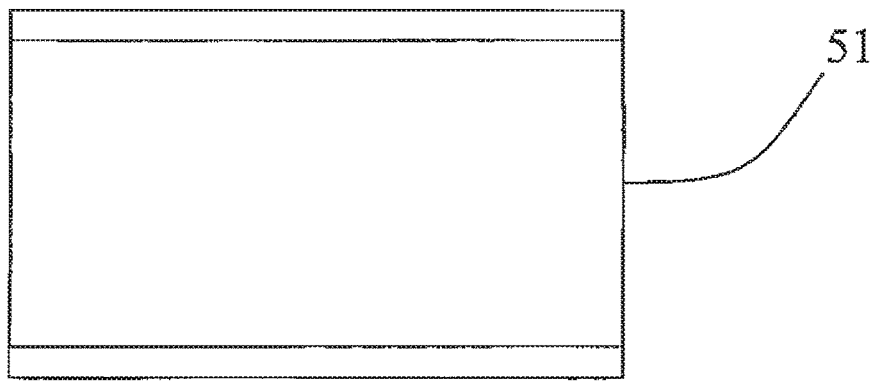
FIG. 8 is a schematic plan view of the slide board.
Figure 9:
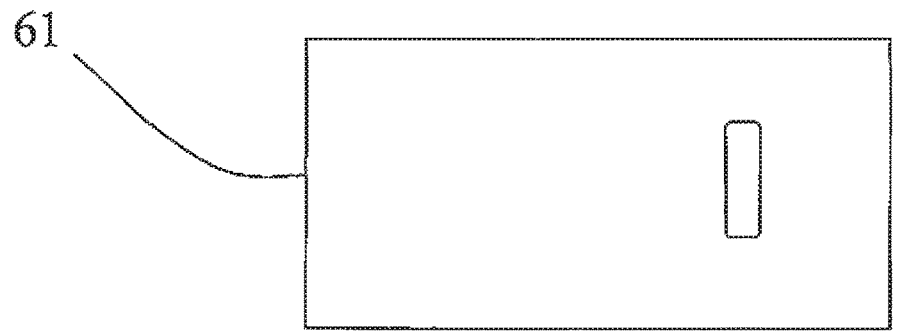
FIG. 9 is a schematic plan view of the metal plate.
Figure 10:
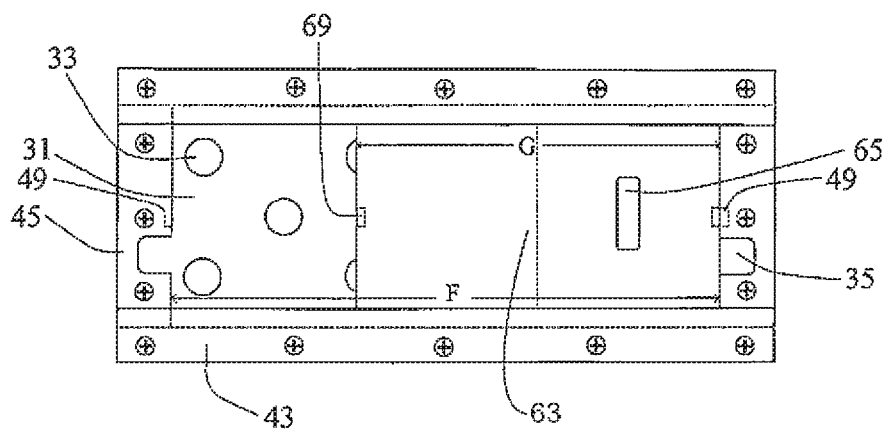
FIG. 10 is a schematic plan view of the jig of the manufacturing device of an embodiment in a state where the first step of the manufacturing method is being executed.
Figure 11:
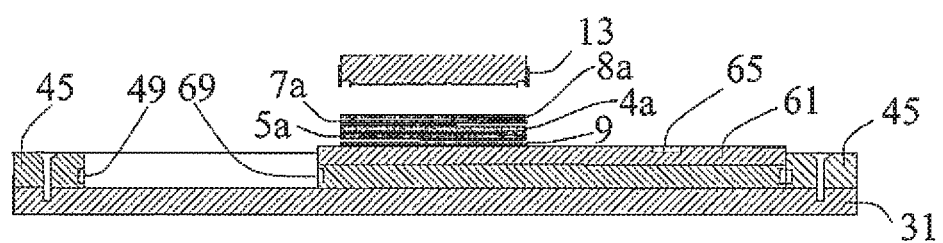
FIG. 11 is a schematic cross sectional view of an emblem being manufactured in the first manufacturing step.

Firstly, a jig 21 that is movable in axial directions relative to the upper metal mold 11 is prepared. In FIG. 4, the axial directions refer to the direction running from left to right and the direction running from right to left. The jib 21 includes a table 31 that also operates as cathode, a support frame 41 arranged along a periphery and on the upper surface of the table 31, a slide board 51 arranged on an upper surface of the table 31 so as to be movable in the axial directions and a metal plate 61 arranged on the upper surface of the slide board 51 so as to be slidable with the slide board 51, the metal plate 61 also operating as cathode.

The table 31 is an oblong rectangular object having long sides and short sides. It has a flat upper surface and a flat lower surface.

A solid lubricating agent 33 is arranged on an upper surface of the table 31 so as to allow the slide board 51 to easily slide thereon. A solid lubricating agent 33 may be arranged on the entire upper surface of the table 11 or as a plurality of spots on the upper surface of the table 11 as in the case of the illustrated embodiment. From the view point of manufacturing cost, it is preferably arranged as a number of spots. The upper surfaces of the spots of the solid lubricating oil 33 may be substantially flush with the upper surface of the table as in the case of the illustrated embodiment or slightly upwardly protruding from the upper surface of the table 31.

Any known lubricating agent 33 that is solid and having a lubricating effect may be used as the solid lubricating agent 33.

In the instance of the illustrated embodiment, the support frame 41 includes long side support frame members 43 extending to the entire length of the long sides of the table 31 so as to partly cover the upper surface of the table 31 along the long sides thereof and short side support frame members 45 arranged so as to extend between the long side support frame members 43 and partly cover the upper surface of the table 31 along the short sides thereof. Thus, the support frame 41 is arranged along the outer periphery of the upper surface of the table 1 and rigidly secured to the upper surface of the table 31. In the instance of the illustrated embodiment, the support frame 41 is rigidly secured by screws, although the embodiment is by no means limited to the use of screws for rigidly securing the support frame 41 to the table 31. Stepped sections 47 are formed respectively on lower surfaces of the long side support frame members 43 at the transversally inner sides of the long side support frame members 43, so as to allow the guide section of the slide board, which will be described in greater detail hereinafter, to be inserted between them. The short side support frame members 45 are respectively provided with finger receiving grooves 49 so as to allow the slid board 51 to be axially moved with ease as will be described in greater detail hereinafter.

The slide board 51 is an oblong rectangular plate-like object whose axial length (the length of the long sides thereof) is smaller than the axial length (the length of the long sides) of the table 31, and has a flat upper surface and also a flat lower surface. It is axially slidable on the upper surface of the table 31.

The slide board 51 is provided with outwardly projecting stepped sections 53 at lower parts of the long side lateral surfaces thereof. As the stepped sections of the slide board 51 are engaged with the corresponding stepped section 47 of the long side frame support members 43, the slide board 51 becomes axially slidable.

As described above, the solid lubricating agent 33 is arranged on the upper surface of the table 31 so as to allow the slide board 51 to axially slide with ease. The slide board 51 is preferably made of metal, although the material of the slide board 51 is not limited to metal. The axial length F between the inside surfaces of the oppositely disposed short side support frame members and the axial length G of the slide board preferably show a ratio of 3:2. As the slide board 51 is moved in an axial direction, one of the magnets 69 and the corresponding one of the magnets 49 attract each other so as to be rigidly caught by each other. At this time, the center of the flat area of the upper surface 63 of the metal plate 61 is found right below the upper metal mold 11. As the slide board 51 is moved in the opposite direction, the center of the recessed section 65 comes right below the upper metal mold 11. Therefore, the axial length G of the slide board is equal to two thirds of the length F between the inside surfaces of the oppositely disposed short side support frame members.

A metal-made plate 61 is arranged on an upper surface of the slide board 51. The metal plate 61 has an axial length that is equal to the axial length of the slide board 51 and a transversal length smaller than the transversal length of the slide board 51 by the sum of the widths of the stepped sections 53 of the slide board 51.

The metal-made plate 61 has an upper surface 63 and he lower surface. The upper surface 63 of the metal-made plate is flat. The metal-made plate 61 is provided at the transversal center of the upper surface 63 thereof with a recessed section 65 for protecting the IC chip and making it free from pressure. The IC chip is dimensioned so as to snugly abut to the recessed section 65. Differently stated, the IC chip is placed on the upper surface of the recessed section 65. Thus, the upper surface 63 of the metal-made plate 61 includes a flat part (part A) and a recessed part (part B). A cushion member 67 is arranged in the recessed section 65 so as to absorb the pressure applied to the recessed section 65 from above and make the IC chip disposed therein to be free from pressure. Additionally, the arrangement of the cushion member 67 prevents a dead air space from appearing in the inside of the emblem (between the upper layer and the lower layer).

While sponge or rubber may be used as the material of the cushion member 67, the embodiment is by no means limited to the use of sponge or rubber as the material of the cushion member. In other words, any well-known appropriate material may be used for the cushion member so long as it absorbs the pressure applied to it from above.

The metal-made plate 61 is provided with positioning magnets 69 that are arranged at respective transversally center positions on the axially opposite surfaces thereof, whereas the short side support frames 45 are respectively provided with positioning magnets 49 that are arranged at positions that correspond to the respective positioning magnets 69. Thus, when the slide board 51 is driven to axially slide, it is transversally aligned with the short side support frames 45.

The jig 21 has the above described components, and the slide board 51 thereof is axially slidable relative to the metal plate 31. Additionally, a cushion member 67 is arranged in the recessed section 65 which is formed on the upper surface of the metal plate 61 that is placed on the slide board 51 as described above so that the IC chip is made free from pressure and prevented from being damaged. Note that a piece of insulation fabric (not shown in the drawings) is arranged on the metal plate 61.

<Manufacturing Method>

When manufacturing an emblem with an embedded IC chip by means of the above described manufacturing device, firstly, a sheet of release paper 9 is put on the flat part (block A) of the upper surface of the metal plate 61 and, if necessary, the intermediate layer material 5a is placed on the sheet of release paper. Subsequently, the surface layer material 4a is placed on the intermediate layer material 51. If necessary, a sheet of carrier film 7a may be put on the surface layer material 41, and a additionally a sheet of polypropylene film 8a may be placed on the carrier film 7a. The reason why a sheet of release paper 9 is placed is to prevent the molten material from sticking to the metal-made plate 61 due to the high frequency dielectric heating operation executed in the first step (of shaping the surface layer material 4a and the intermediate layer material 5a by high frequency dielectric heating and bonding the surface layer material 4a and the intermediate layer material 5a together by fusion bonding) because otherwise the molten material sticks to the metal-made plate 61. The upper metal mold 11 located above the above listed materials.

The upper metal mold 11 is lowered to downwardly press the above listed materials and produce a three-dimensional pattern (the first step). When an intermediate layer material is used, the upper layer material and the intermediate layer material are bonded together by fusion bonding to produce an intermediate 23. An appropriate known techniques is employed for the operation of forming a three-dimensional pattern and that of fusion bonding. Since the above listed materials are placed on the flat area of the upper surface of the metal plate 61, a three-dimensional pattern can accurately be produced. The produced intermediate 23 (as a result of bonding the surface layer material and the intermediate layer material together by fusion bonding) is temporarily held to the upper metal mold 11 by the temporary holding means 13.

Subsequently, the upper metal mold is moved upward. The intermediate 23 is also moved upward with the upper metal mold because the intermediate 23 is temporarily held to the upper metal mold by the temporary holding means 13 as described above. Since release paper is arranged on the lower surface of the intermediate 23, the upper layer material and the intermediate layer material do not adhere to the metal-made plate 61 even if they are molten by heat so that only the intermediate 23 is brought upward by the upper metal mold.

Then, the slide board is driven to axially slide until the recessed section 65 at the center of the block B is found right below the upper metal mold. At this time, the slide board would not be transversally displaced because of the provision of the positioning magnets 69 and 49.

Thereafter, the lower layer material is placed on the metal plate 61.

A necessary material may appropriately be selected for the lower layer material. For example, when a thermal adhesive type emblem is to be manufactured, firstly a sheet of release paper is placed in position, then a sheet of hot melt film is placed thereon and subsequently a sheet of synthetic resin film to which the IC chip (storing an ID number in it) has temporarily been held is placed on the hot melt film. A well-known appropriate material may be used for the lower layer material. In the case of the illustrated embodiment, firstly the sheet of release paper 9c is placed on the upper surface of the metal plate 61, then the sheet of hot melt film 9a is placed on the upper surface of the sheet of release paper 9c and subsequently a sheet of thermoplastic synthetic resin film 9b is placed on the upper surface of the sheet of hot melt film 9a.

The temporarily holding means may be used by well known art, such as double sided tape, adhesive tape. The IC chip may be placed so as to accurately be located in the recessed section 65 of the metal plate 61 on the slide board 51.

Figure 12:
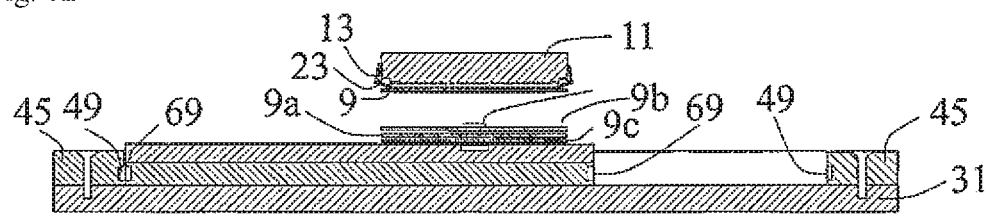
FIG. 12 is a schematic cross sectional view of an emblem being manufactured in the second manufacturing step. Best Mode for Carrying Out the Invention

Then, only the sheet of release paper is peeled off from the intermediate 23 that is temporarily held to the upper metal mold. Note that FIG. 12 schematically illustrates the state of the sheet of release paper before it is peeled off.

Then, the upper metal mold 11 is lowered to press down the lower layer material (which includes the sheet of release paper, the hot melt film 9a and the thermoplastic synthetic resin film 9b in the case of the illustrated embodiment) and the intermediate 23 and a high frequency wave is transmitted to them to bond the intermediate 23 and the lower layer material together by fusion bonding before the above listed materials are cut by fusion cutting. Then, all the unnecessary parts are removed by means of a well-known technique to produce a finished emblem. Since the IC chip is located in the recessed section 45 and a cushion member is arranged on the bottom surface of the recessed section 45, the IC chip is not damaged if it is pressed by the upper metal mold and the three-dimensional pattern formed on the surface of the emblem would not be deformed by the IC chip.

What is claimed is:

1. A method of manufacturing an emblem of a thermoplastic synthetic resin material with an incorporated IC chip by high frequency dielectric heating, the method comprising:
    arranging a sheet of release paper on a flat upper surface of a table, the table operating as cathode, and arranging an upper layer material on an upper surface of the sheet of release paper;
    pressing the upper layer material with an upper metal mold from above the upper layer material and subjecting the upper layer material to high frequency dielectric heating such that a given shape is imparted to the upper layer material and an intermediate is produced;
    arranging for the upper metal mold to temporarily hold the intermediate and lifting the upper metal mold along with the intermediate;
    axially sliding a slide board disposed on the table such that a recessed section formed on an upper surface of a metal plate is placed on the slide board below the upper metal mold;
    placing the sheet of release paper, a lower layer material, and the IC chip on the recessed section; and
    lowering the upper metal mold to press the intermediate, the IC chip, and the lower layer material, and subjecting the intermediate, the IC chip, and the lower layer material to high frequency dielectric heating so as to bond the intermediate and the lower layer material together by fusion bonding.

2. The method according to claim 1, wherein the sheet of release paper is disposed on a lower surface of the upper layer material.

3. The method according to claim 1, wherein a sheet of carrier film is disposed on an upper surface of the upper layer material, and a sheet of polypropylene film is disposed on the upper surface of the sheet of carrier film.

\* \* \* \* \*